E. S. SALYARDS.
TRACTOR WHEEL.
APPLICATION FILED APR. 16, 1920.
1,405,804.
Patented Feb. 7, 1922.
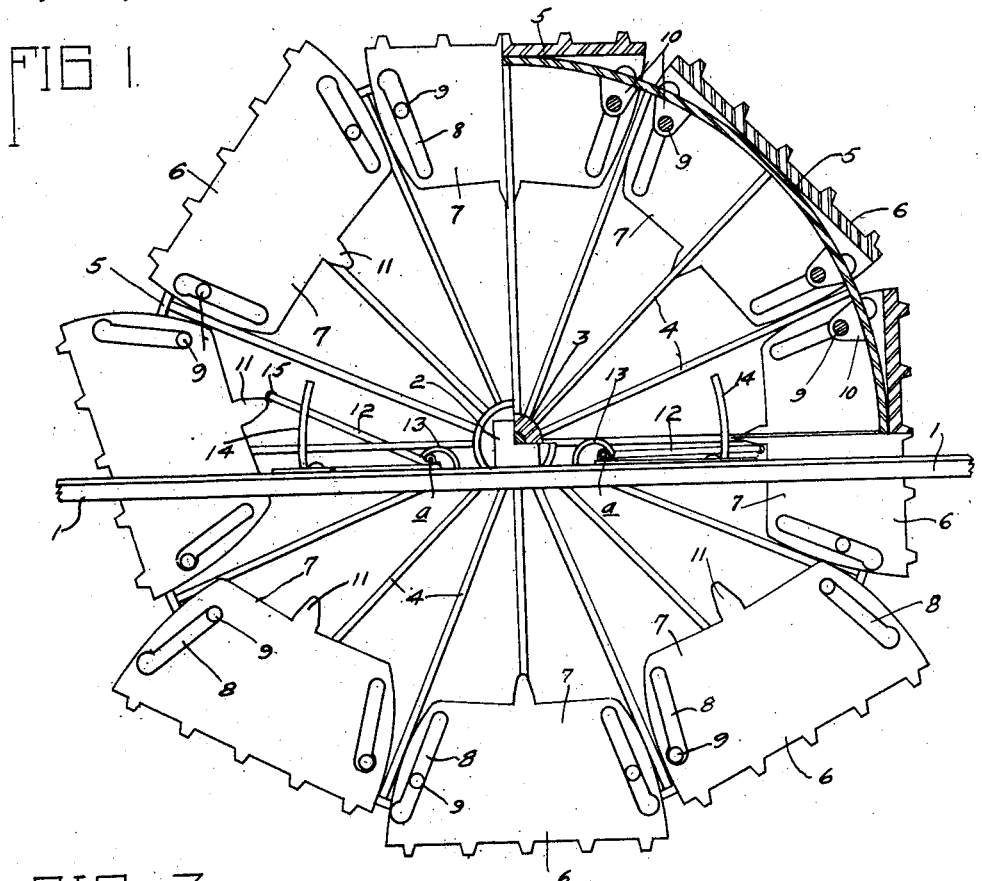
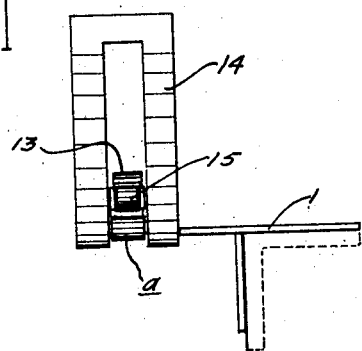
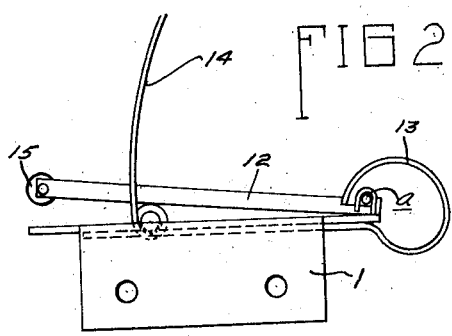
INVENTOR
Elmer S. Salyards,
BY Walter N. Haskell,
his ATTORNEY

UNITED STATES PATENT OFFICE.

ELMER S. SALYARDS, OF ROCK ISLAND, ILLINOIS.

TRACTOR WHEEL.

1,405,804. Specification of Letters Patent. Patented Feb. 7, 1922.

Application filed April 16, 1920. Serial No. 374,363.

*To all whom it may concern:*

Be it known that I, ELMER S. SALYARDS, a citizen of the United States, residing at Rock Island, in the county of Rock Island and State of Illinois, have invented certain new and useful Improvements in Tractor Wheels, of which the following is a specification.

My invention has reference to tractor wheels, and aims to improve the simplicity and efficiency thereof. It pertains specially to wheels which are fitted with sectional tread members, supported in a yielding manner with relation to the main rim of the wheel. It is not only essential that the tread sections be supported so as to have a limited independent action, so as to be in a proper position when coming into engagement with the earth, but some means of control must also be provided to compel the movement of the tread section into the desired position. In the present invention the tread sections are so constructed and arranged that they will adjust themselves readily to the required positions. Mechanism is also provided for making the necessary adjustments of said parts, and for bringing such parts into proper relation with the earth upon approaching the same, when the wheel is turning in either direction.

The particular construction, arrangement, and operation of the various parts of my invention will be more fully understood from the following specification, reference being had to the drawings accompanying the same, in which the preferred embodiment of the device is set forth.

In said drawings:

Fig. 1 shows my invention in side elevation, with a portion thereof in section, to more fully illustrate the same.

Fig. 2 is an enlarged view, in detail, of the trip mechanism.

Fig. 3 is an outer end view thereof.

1 represents a part of the frame of a machine, upon which is supported bearings 2, in which is rotatably mounted a wheel, comprising a hub 3, united by spokes 4 with a rim 5. On the outer face of said rim are arranged at regular intervals tread sections 6, held in place by means of flanges 7, projected inwardly past the edges of the rim and provided with radially disposed slots 8, engaging pins 9 fixed in bearings 10 on the inner face of the rim 5. This permits a rocking movement of the section 6 with relation to the rim, the convergence of the slots 8 of each flange being such that the pins will readily adapt themselves therein. When one pin is at the outer end of one pair of slots the other pin will be at the inner end of the other slot, and vice versa.

The flanges 7 are provided on their inner edges with tri-angular shaped lugs 11, and supported at the inner side of the frame 1 at each side of the wheel, is a trip-arm 12, pivoted as at *a*, the free end of such arm projecting into the path of the lug 11, as the tread-member moves downwardly, tipping such member so that the lower corner will be moved inwardly, to the full extent of the movement thereof. By this means the face of the tread-section is brought into approximate alignment with the earth, so as to be set flatly thereon, as shown at the bottom of the wheel in Fig. 1. The wheel then rolls over this tread and onto the next one. At the opposite side of the frame the trip arm 12 is lifted by the lug 11 until the lug slips past the end thereof. Said arm is held yieldably in place by means of a spring 13 at the inner end thereof, and side movement of the arm is prevented by a guide 14, in which it operates. The arms 12 are provided at their outer ends with anti-friction rollers 15.

If the wheel is moved in the opposite direction to that indicated in the drawings, the movement of the trip mechanism is reversed, and the operation repeated at the opposite side of the wheel.

The action of each of the tread sections, as it is placed on the ground, is largely similar to that of a foot, the heel being planted first, but without causing the end of the tread to dig into the ground to any extent.

At one point in the rotation of the wheel the tread section has a pivotal movement on the pin 9 which is in the outer end of the slot, and such outer ends are therefore enlarged slightly, so as to facilitate such movement.

What I claim and desire to secure, is:

A device of the class described, comprising a wheel, provided with a continuous rim; tread sections arranged at regular intervals on said rim, so as to be permitted a rocking adjustment with relation thereto, and having inwardly projecting flanges each provided with inwardly converging slots; pins carried on the inner face of said rim in engagement with said slots; lugs on the inner edges of said flanges; and spring-controlled trips mounted in the path of said lugs, and adapted to rock said tread sections into a desired operating position.

In testimony whereof I affix my signature.

ELMER S. SALYARDS.